United States Patent [19]

Campbell et al.

[11] Patent Number: 5,163,705
[45] Date of Patent: Nov. 17, 1992

[54] SELECTABLE DAMPING VEHICLE SUSPENSION CONTROL RESPONSIVE TO TRANSMISSION SHIFT

[75] Inventors: Douglas C. Campbell, Romulus; Howard H. Ludwig, E. Detroit; Fred G. Wood, Novi; David C. Poirier, Troy; Patrick J. Westphal, Canton, all of Mich.

[73] Assignee: General Motors Corporation, Detroit, Mich.

[21] Appl. No.: 747,199

[22] Filed: Aug. 16, 1991

[51] Int. Cl.⁵ .......................................... B60G 17/015
[52] U.S. Cl. .................................................. 280/707
[58] Field of Search ...................... 280/707, 703, 840

[56] References Cited

U.S. PATENT DOCUMENTS

| | | | |
|---|---|---|---|
| 4,602,805 | 7/1986 | Tanaka et al. | 280/707 |
| 4,669,750 | 6/1987 | Tanaka et al. | 280/707 |
| 4,686,626 | 8/1987 | Kuroki et al. | 364/426 |
| 4,691,284 | 9/1987 | Izumi et al. | 364/424 |
| 4,809,660 | 3/1989 | Marsh et al. | 123/417 |

FOREIGN PATENT DOCUMENTS 0152911  7/1987  Japan .................................. 280/707

OTHER PUBLICATIONS

"Speed—dependent damping for the Cadillac Allante", *Automotive Technology International* 1990, Sterling Publications International, Ltd. 1990.

*Primary Examiner*—Charles A. Marmor
*Assistant Examiner*—Tamara L. Graysay
*Attorney, Agent, or Firm*—Robert M. Sigler

[57] ABSTRACT

A vehicle suspension comprises dampers changeable between low and high damping modes and normally operated in the low damping mode. A damper control stores a plurality of sets of reference numbers as a function of vehicle velocity, the reference numbers of each set representing limit values of throttle velocity for the low damping mode for a given transmission gear mode. The reference numbers of each set increase in value with increasing vehicle velocity in a continuously non-linear manner so as to compensate for the decreasing acceleration and body lift produced by a given throttle velocity as vehicle velocity increases. The control changes the damper from low to high damping during vehicle acceleration for a predetermined time when the throttle velocity exceeds a throttle velocity limit reference derived from the reference number corresponding to the vehicle velocity in the set corresponding to the selected transmission gear mode. The control further changes the dampers from low to high damping for a predetermined time when vehicle deceleration exceeds a reference, when a transmission shift occurs or when engine torque first exceeds a reference.

1 Claim, 3 Drawing Sheets

SELECTABLE DAMPING VEHICLE SUSPENSION CONTROL RESPONSIVE TO TRANSMISSION SHIFT

BACKGROUND OF THE INVENTION

This invention relates to vehicle suspensions of the type having dampers with at least two selectable damping characteristics, one of which provides higher damping than the other. It further relates to such vehicle suspensions having controls effective to change the dampers to the higher damping mode when the vehicle is accelerating or decelerating so as to reduce vehicle body dive and lift due to the vehicle deceleration and acceleration.

The prior art shows a number of such suspension systems. For example, some systems are responsive to the application of vehicle brakes to change to the high damping mode and reduce anticipated body dive due to braking. Other prior art systems change to the high damping mode in response to such sensed vehicle parameters as vehicle speed, steering angle, transmission gear selection, and throttle position.

Another type of prior art system provides active force generation by pumping fluid in and out of fluid spring chambers associated with the suspension system to counteract vehicle body rolls about various axes. One particular such system, shown in U.S. Pat. No. 4,602,805 to Tanaka et al, issued Jul. 29, 1986, exhausts fluid from the front wheel fluid spring chambers and provides fluid to the rear wheel fluid spring chambers when vehicle acceleration is indicated by various combinations of vehicle speed, transmission gear mode and throttle velocity. This system is more complex and expensive and less energy efficient than a simple selectable damper system. In addition, to detect vehicle acceleration, this system compares each of vehicle velocity and throttle velocity with fixed references, which are independent of the other of these variables; and the system is thus too sensitive to throttle movement at high vehicle velocities, where a given throttle velocity produces a small vehicle acceleration and little body lift, compared with low vehicle velocities, where it will produce a significantly greater acceleration and body lift.

SUMMARY OF THE INVENTION

The suspension system of this invention therefore provides, in a wheeled vehicle having an engine and a transmission with a plurality of selectable gear modes and means for shifting therebetween, a damper with a low damping mode and a high damping mode and a suspension control effective to select one of the low and high damping modes. The suspension control comprises means for storing, for a transmission shift from a first one of the plurality of selectable gear modes to a second one of the plurality of selectable gear modes, a number representing a time duration. The suspension control further comprises means responsive to a transmission shift from the first one of the plurality of selectable gear modes to the second one of the plurality of selectable gear modes for temporarily changing the damper from the low damping mode to the high damping mode for the time period represented by the stored number.

The time period may be at least as long as the transmission shift itself, so that the damper is returned to the low damping mode only after the cessation of the any tendency to lift or dive as a result of the shift. The high damping mode during transmission shift reduces lift or dive during transmission shifting and contributes to an improved transmission shift "feel" for the vehicle operator. Further details and advantages of this invention will be apparent from the accompanying drawings and following description of a preferred embodiment.

DESCRIPTION OF THE PREFERRED EMBODIMENT

Figure 1:
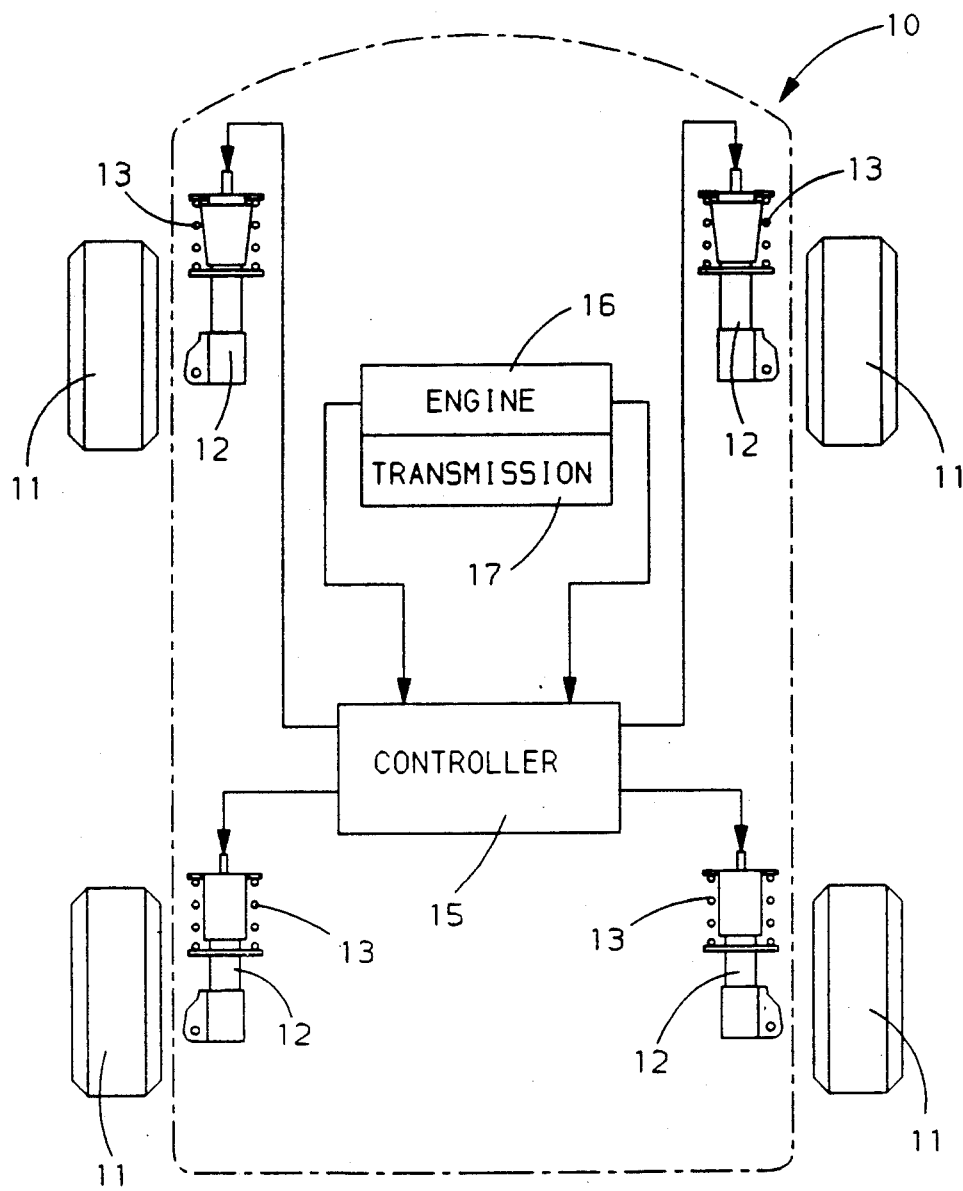
FIG. 1 is a schematic diagram of a vehicle with a suspension system according to the invention.

Referring to FIG. 1, a generally rectangular motor vehicle body 10 is supported on four wheels 11 by suspension apparatus comprising an adjustable damper 12 and a spring 13 at each wheel 11. One each of the adjustable dampers 12 and the springs 13 are provided at each corner of vehicle body 10. Adjustable dampers 12 are provided with apparatus for selecting at least two damping modes, one of which provides a higher damping force than the other. For example, dampers 12 may be provided with a selector valve having a member rotatable through a plurality of positions by an internal actuator to provide different orifice sizes and thus produce different damping characteristics in various rotary positions. Alternatively, dampers 12 may be provided with an actuator operated bypass valve which may be opened or closed to provide lower and higher damping modes. The precise structure of dampers 12 is unimportant to this invention; and many such dampers are known in the prior art. Thus, they need not be further described.

A controller 15 provides actuating signals to the actuators of dampers 12 for selection of damping mode and generates these signals in response to input signals from vehicle engine 16, transmission 17 and other sources as required. Controller 15 may comprise a standard digital computer having a CPU, RAM, ROM and input/output (I/O) apparatus, as well known in the art. Controller 15 contains a stored control program in ROM which coordinates the reception of input signals, processes a control algorithm using the inputs to derive the desired damping mode, and outputs signals to additional circuitry associated with dampers 12 which is responsive to the signals to put dampers 12 in the desired damping mode. Controller 15 also stores in ROM a plurality of sets of reference numbers representing limiting throttle velocities for the low damping mode as a function of vehicle velocity. Transmission 17 has a plurality of selectable gear modes; and each set of reference numbers corresponds to one of the selectable gear modes of transmission 17. These sets of reference numbers will be described in more detail hereinafter.

Figure 3A:
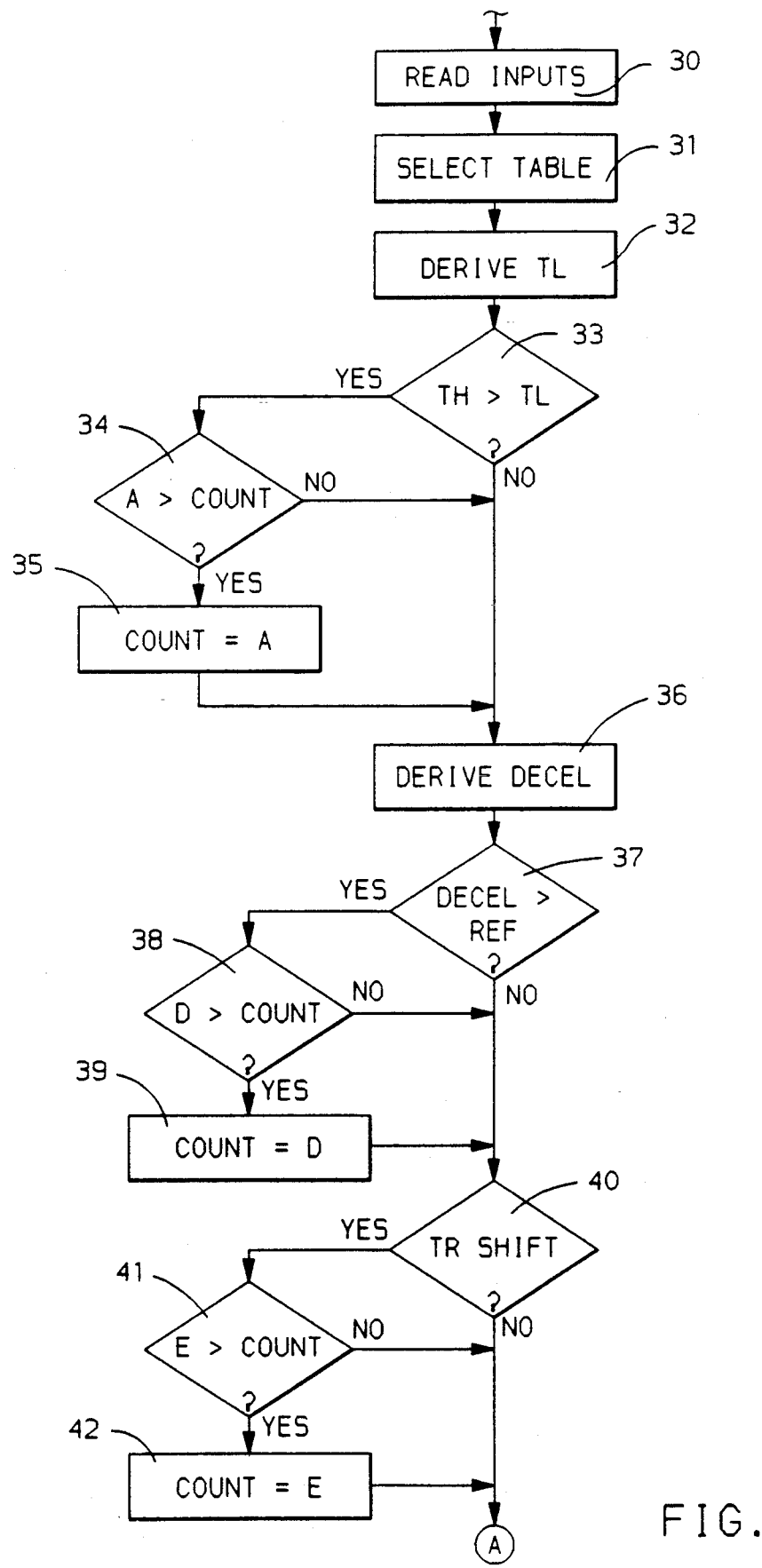
FIG. 3 (a, b) shows a flow chart illustrating the operation of the suspension system of FIG. 1.
Figure 3B:
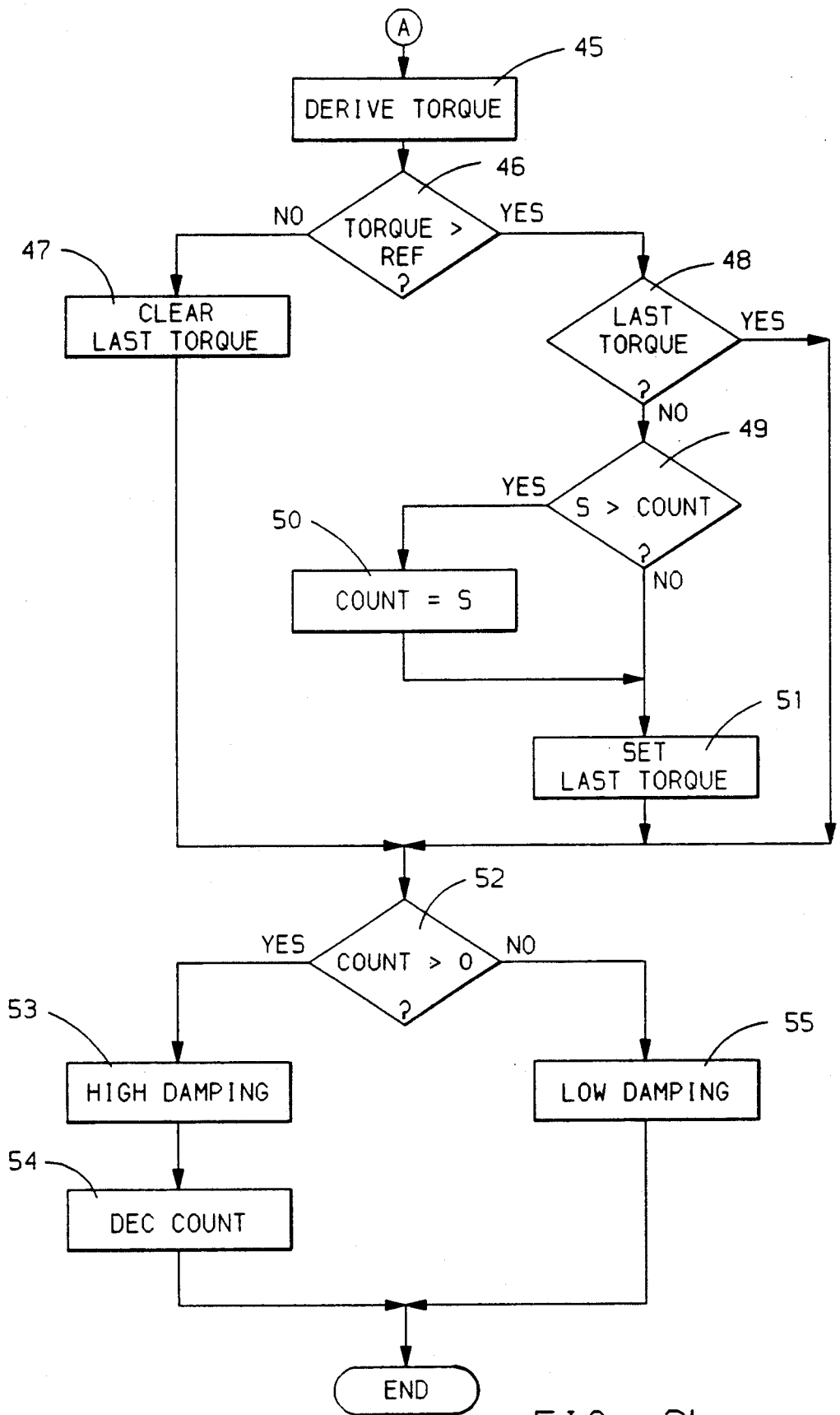

FIG. 3 shows a flow chart of the relevant portion of the control program of controller 15. In step 30, the required inputs are read and stored in RAM. Such inputs may comprise a selected transmission gear mode signal TR from transmission 17 or from an electronic control therefore, a throttle position signal from a throttle position sensor on engine 16 and engine speed detecting pulses from a toothed wheel in transmission 17 or any other convenient source. If the computer of controller 15 is the engine control computer for the vehicle, some of these signals will already be available, having been read and stored for the engine control algorithms. If an electronic transmission control is used with transmission 17, the transmission gear mode signal TR may be a commanded transmission gear selection, which is an advantage since controller 15 can anticipate a new transmission gear mode selection before it actually occurs.

Figure 2:
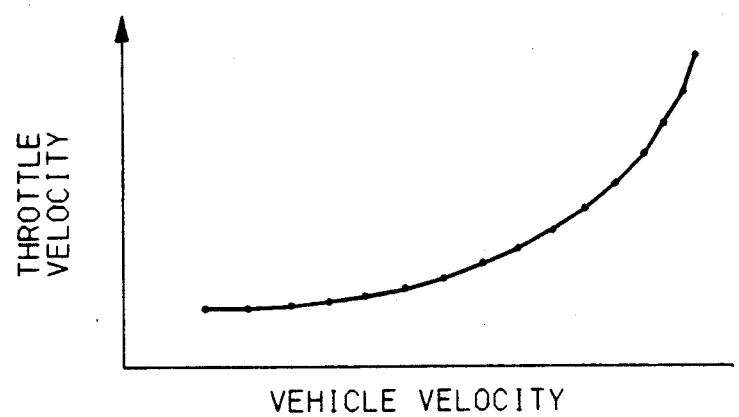
FIG. 2 is a graph of a set of reference numbers showing the continuously non-linear increasing limiting throttle velocities for the low damping mode as a function of vehicle velocity for the suspension system of FIG. 1.

The lift effect of vehicle acceleration is determined by the throttle velocity for a given vehicle velocity and selected transmission gear mode. Therefore, in step 31, one of the sets of reference numbers is selected in accordance with the selected transmission gear mode signal TR. In step 32, a throttle velocity limit reference number TL corresponding to the vehicle velocity VV is derived from the selected set of reference numbers. FIG. 2 shows a graph illustrating a typical such set or table. Each dot corresponds to a stored reference number associated with a finite value of vehicle velocity. The line drawn through the dots shows how the values of the reference numbers increase with increasing vehicle velocity in a continuously increasing non-linear manner, which corrects for the decreasing acceleration produced by a given throttle velocity as vehicle velocity increases. The vehicle velocity VV, if not already calculated for engine control purposes, is calculated from the time rate of reception of the aforementioned speed detecting pulses. If the vehicle velocity happens to be precisely one of the finite values of vehicle velocity corresponding to one of the reference numbers, a simple table lookup is performed to produce the corresponding reference number itself as the throttle velocity limit reference number TL. However, since there are only a finite number of reference numbers stored in each set, the current value of vehicle velocity VV may fall between two adjacent lookup values. In this case, a standard linear interpolation is performed for more accuracy. The derived throttle velocity limit reference number TL specifies the highest throttle velocity for which low damping is allowed for the selected transmission gear mode TR and vehicle velocity VV used in its derivation.

At decision point 33, the throttle velocity TH is compared with the derived throttle velocity limit reference number TL. The throttle velocity TH, if not already available for engine control purposes, may be calculated from the difference between the two most recently input values of throttle position. If the throttle velocity exceeds the reference TL, the high damping mode is desired for a time period at least equal to A program loops, where A is an integer. A variable COUNT, which is initialized as zero at the beginning of operation of the system, is used to store the time period, expressed in an integer count of program loops, for which high damping is still desired. From time to time, during the repeated looping of the control program described herein, COUNT may be reset to some integer value such as A to produce high damping for the associated predetermined time; and COUNT is decremented once in each program loop. However, at any given time, a longer period of high damping may already have been chosen by some other portion of the control program; and it is not desired to decrease this other time by automatically setting COUNT equal to A. Therefore, at decision point 34, A is compared to COUNT. If A exceeds COUNT, COUNT is set equal to A at step 35. However, if A does not exceed COUNT, COUNT is not changed at this point. It should further be noted that COUNT will be reset to A (or left at a higher number) during each program loop in which the throttle velocity exceeds the reference TL. Thus, the time period controlled by integer A actually begins when the throttle velocity no longer exceeds the reference TL. The high damping mode is selected for the duration of the time in which the throttle velocity exceeds TL and a predetermined time period thereafter.

From step 35, from decision point 34 if A does not exceed COUNT, or from decision point 33 if TH does not exceed the reference TL, the program proceeds to determine whether high damping is required due to deceleration of the vehicle. High damping is desired during and for a brief predetermined time after a deceleration to prevent body dive. The procedure for determining deceleration, however, is different from that described above for acceleration. The actual deceleration DECEL is determined at step 36 as the difference between the last two values of vehicle velocity VV. At decision point 37, if the sign of DECEL indicates deceleration, the magnitude of DECEL is compared with a reference REF representing the lowest value of DECEL for which high damping is desired. If DECEL exceeds REF, the high damping mode is desired for a time period at least equal to D program loops. The program thus first determines, at decision point 38, if D exceeds COUNT. If it does, then COUNT is set equal to D at step 39 so that at least D program loops of high damping will be produced. If D does not exceed COUNT, COUNT is not changed.

From step 39, or from decision point 38 if D does not exceed COUNT, or from decision point 37 if DECEL does not exceed REF, the program proceeds to check for a transmission shift. High damping is desired during a transmission shift and for a predetermined time thereafter to reduce body lift or dive and to provide an improved shift "feel" to the vehicle operator. At decision point 40, a transmission shift is detected. This may be determined by comparing the present selected transmission gear mode signal TR with the stored last value thereof. If a shift has occurred, the high damping mode is desired for a time period comprising E program loops, where E may have a different value for each specific shift, such as 1-2, 2-3, 3-2, etc. This portion of the control program works very well with an electronic transmission control, since transmission shifts are commanded in response to a transmission control program and the information concerning a transmission shift is thus available before the shift commences. However, it may also be applied to a more conventional transmission as long as the selected transmission gear mode signal TR is available. At decision point 41, the integer E determined by the particular shift is compared to the value of COUNT. If E exceeds COUNT, then COUNT is set equal to E at step 42. If E does not exceed COUNT, COUNT is not changed.

From step 42, or from decision point 41 if E does not exceed COUNT, or from decision point 40 if no transmission shift has occurred, the program proceeds to check engine torque. It may be desired to supplement the acceleration detection by throttle velocity as previously described with a detection of engine torque, since body lift may be caused by a small change in throttle velocity at low vehicle velocities. Thus, at step 45, TORQUE is derived. This may be accomplished in a number of different ways known in the prior art; however, one such method is described in Marsh et al U.S. Pat. No. 4,809,660 issued Mar. 7, 1989, which is incorporated herein by reference. The value of TORQUE is then compared, at decision point 46, with a reference LIM. If TORQUE does not exceed LIM, a LAST TORQUE flag is cleared at step 47. If TORQUE exceeds LIM, it is determined at decision point 48 if the LAST TORQUE flag is set. If not, this program loop has detected the initiation of the value of TORQUE greater than LIM; and high damping is desired for a time period equal to S program loops. Therefore, S is compared with the value in COUNT at decision point 49. If S exceeds COUNT, COUNT is set equal to S at step 50. If S does not exceed COUNT, COUNT is not changed. From step 50, or from decision point 49 if S does not exceed COUNT, the program next sets the LAST TORQUE flag at step 51.

It will be seen that the treatment of the TORQUE variable is somewhat different from that of the other variables processed earlier in the program. The contribution of TORQUE to COUNT occurs only once for each excursion of TORQUE above the reference LIM, as controlled by the LAST TORQUE flag. This is due to the fact that TORQUE may, in some circumstances, exceed LIM for a long period of time in comparatively steady state operating conditions. It is only the initiation of an elevated TORQUE variable that indicates the possibility of body dive or lift. Therefore, the high damping mode is commanded for the time period S after the initiation of TORQUE exceeding LIM. A continuous high TORQUE level after the time period S is taken to indicate a steady state high torque condition in which high damping is not desired, unless chosen in a different part of the program.

At this point in the program, all decisions have been made concerning high or low damping; and a number exists in COUNT which determines for how many program loops damping will be high. Therefore, from either of steps 47 or 51 or from decision point 48 if the LAST TORQUE flag was found to be set, COUNT is compared with zero at decision point 52. If COUNT is greater than zero, high damping is selected at step 53, such as by setting a HIGH DAMPING flag, which causes dampers 12 to change as required to their high damping mode. Next, at step 54, COUNT is decremented. If COUNT is not greater than zero, it must be equal to zero; and the low damping mode is chosen at step 55, for example by resetting the aforementioned HIGH DAMPING flag, which causes dampers 12 to change as required to their low damping mode. With either of steps 54 and 55, this portion of the program ends.

The embodiments of the invention in which an exclusive property or privilege is claimed are defined as follows:

1. In a wheeled vehicle having an engine and a transmission effective to transmit engine torque to at least one of the wheels thereof in a plurality of selectable gear modes and means for shifting between the selectable gear modes, suspension apparatus having a damper with a low damping mode and a high damping mode and a suspension control effective to select one of the low and high damping modes, the suspension control comprising, in combination:

means for storing, for a transmission shift from a first one of the plurality of selectable gear modes to a second one of the plurality of selectable gear modes, a number representing a time duration; and means responsive to a transmission shift from the first one of the plurality of selectable gear modes to the second one of the plurality of selectable gear modes for temporarily changing the damper from the low damping mode to the high damping mode for the time period represented by the stored number.

* * * * *